June 11, 1957   J. SZYDLOWSKI   2,795,372
TURBINE DRIVEN COMPRESSED AIR GENERATOR
Filed May 26, 1954   2 Sheets-Sheet 1

June 11, 1957 J. SZYDLOWSKI 2,795,372
TURBINE DRIVEN COMPRESSED AIR GENERATOR
Filed May 26, 1954 2 Sheets-Sheet 2

INVENTOR.
Joseph Szydlowski,
BY
Wenderoth, Lind & Ponack
ATTYS.

United States Patent Office 2,795,372
Patented June 11, 1957

2,795,372

TURBINE DRIVEN COMPRESSED AIR GENERATOR

Joseph Szydlowski, Usine Turbomeca, Bordes, France

Application May 26, 1954, Serial No. 432,561

Claims priority, application France February 22, 1950

9 Claims. (Cl. 230—116)

This application is a continuation-in-part of application Serial No. 207,197 filed January 22, 1951, now abandoned.

This invention relates to a turbine driven compressed air generator designed for delivering compressed air wherever needed and particularly for sealed aircraft cabins.

An object of the invention is to provide a compressor which is driven by a gas turbine whose entire power is used for compressing the air that is used both for feeding the turbine and for producing the excess of compressed air designed for additional use.

A further object of the invention is to construct an independent unit of reduced weight for producing compressed air.

A further object of the invention is to provide a concentric arrangement of elements whereby an annular reservoir for compressed air is insulated by an air distribution chamber from the combustion chamber wherein the power for driving the turbine is generated.

A still further object of the invention is to bleed the air radially outwardly from the distribution chamber to the annular air reservoir which is concentric therewith.

A still further object of the invention is to provide a compact, concentric and symmetrical arrangement of parts conducive to greater efficiency and reduction in weight.

With the above and other objects in view which will become apparent from the detailed description and claims below, one form of the invention is shown in the drawings, in which:

Figure 1:
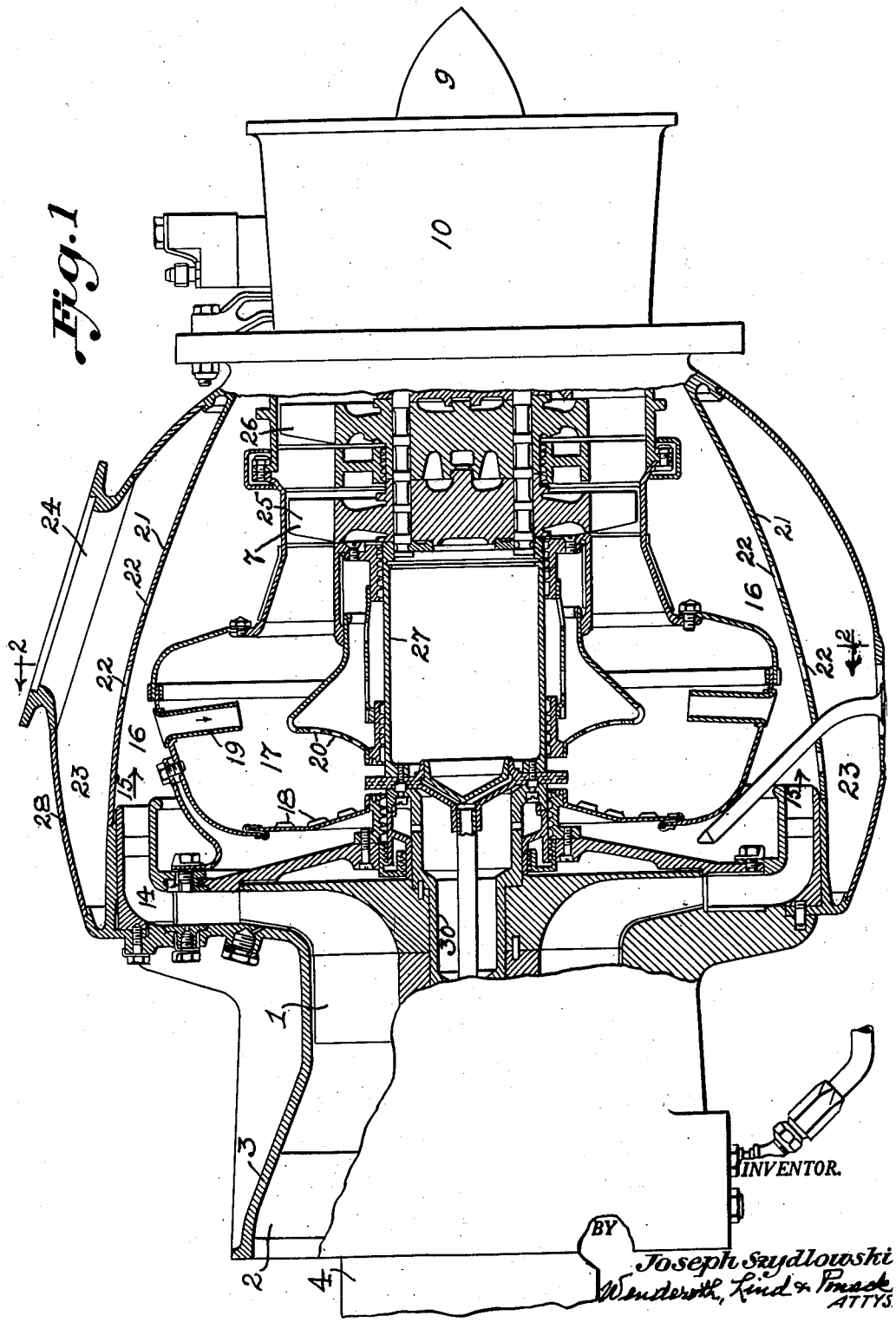
Fig. 1 is a longitudinal cross-sectional view with parts in elevation.
Figure 2:
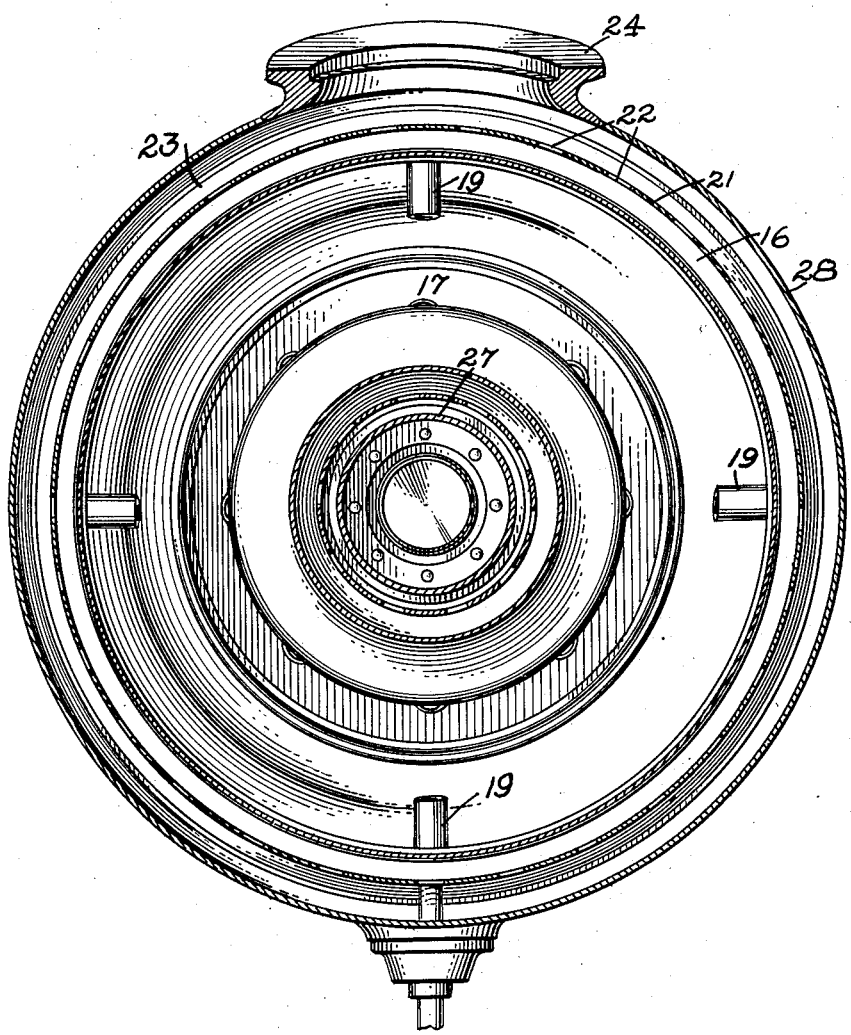
Fig. 2 is a cross-sectional view taken upon the section line 2—2 of Fig. 1 looking in the direction of the arrows.

In the drawings, the centrifugal compressor is shown at 1 which draws atmospheric air through the diffuser 2 located between the casing 3 and the center cowl 4. The compressed air from the compressor 1 is forced through the annular channel 14 and directed horizontally rearwardly as indicated by the arrows 15 in an annular stream into the distribution chamber 16. From the distribution chamber 16 the air is supplied to the combustion space 17 through the louvres 18, the tubes 19 and the openings 20 in the rear wall of the combustion space 17 as more fully described in co-pending applications Serial No. 386,761 filed October 19, 1953, and Serial No. 386,762 filed October 19, 1953 entitled respectively, "Coaxial Combustion Products Generator" and "Turbine and Combustion Chamber with Diverse Combustion and Diluent Air Paths."

A casing 21 surrounds the combustion chamber 17 and is provided with spaced apertures or bleed ports 22 from which air may be bled radially outwardly from the distribution space 16 to the air reservoir 23. A tap 24 is provided in the air reservoir whereby air may be withdrawn from the reservoir 23 and distributed where desired.

The reservoir 23 is insulated by the space 16 from the combustion chamber.

At the outlet end of the combustion chamber 17 the combustion gases drive a turbine 7 comprising the turbine wheels 25 and 26 which are fixed to the shaft 27. The turbine may comprise a single stage or a plurality of stages. From the turbine the combustion gases are exhausted through an annular channel defined by the exhaust casing 10 and the central cowling 9. A plurality of tappings 24 may be provided around the periphery of the reservoir 23. The reservoir 23 is formed by the casing 21 and the outer annular casing 28.

The entire power of the turbine 7 is transmitted by the shaft 27 and shaft 30 secured thereto to the compressor 1 and the compressed air supplied by the compressor 1 is utilized for feeding the combustion chamber and also bleeding a proportion thereof radially outwardly into the air reservoir 23.

The bleed ports 22 are located in the casing 21 more remote from the compressor 1 than are the ports 18, 19 and 20 to the combustion space 17. The relative location of the air distribution chamber and the air reservoir as well as the air intake ports for the combustion chamber and the bleed ports are important in the construction of an efficient air generator.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A turbine driven compressed air generator comprising a turbine, an annular combustion chamber for generating the combustion gases for driving said turbine, an annular air distribution chamber surrounding said combustion chamber for distributing air to various locations in said combustion chamber, a rotary air compressor driven by said turbine, an air reservoir surrounding said distribution chamber and bleed ports located between said distribution chamber and said reservoir for bleeding compressed air radially outwardly from said distribution chamber to said reservoir.

2. A turbine driven compressed air generator comprising a turbine, an annular combustion chamber for generating the combustion gases for driving said turbine, an annular distribution chamber enclosing said combustion chamber for distributing the air to said combustion chamber, a rotary air compressor driven by said turbine, an air reservoir enclosing said distribution chamber and insulated from said combustion chamber by said distribution chamber, communication ducts between said compressor and said distribution chamber and reservoir and said distribution chamber and air reservoir having a common wall extending substantially the full length thereof and beyond the exhaust end of said combustion chamber.

3. A turbine driven compressed air generator comprising a turbine, an annular combustion chamber for generating the combustion gases for driving said turbine, an annular distribution chamber enclosing said combustion chamber, axially spaced port means in said combustion chamber for leading air radially inwardly from said distribution chamber to said combustion chamber, an air reservoir enclosing said distribution chamber, said distribution chamber and air reservoir having a common wall extending substantially the full length thereof and beyond the exhaust end of said combustion chamber, bleed holes in said common wall for interconnecting said reservoir and said distribution chamber and means for conducting air from said compressor to said distribution chamber in a direction coaxial with said turbine and said compressor and a tap connection in said reservoir for leading compressed air away from said reservoir.

4. A turbine driven compressed air generator comprising a turbine, a compressor, a shaft connecting said turbine and compressor, an annular combustion chamber for generating the combustion gases for driving said turbine and disposed longitudinally between said compressor and turbine and concentric with respect to said shaft, an annular air distribution chamber enclosing said combustion chamber and extending longitudinally for the entire length of said combustion chamber, a plurality of longitudinally spaced sets of air inlet ports connecting said distribution chamber with said combustion chamber and through which air is introduced directly into said combustion chamber from said air distribution chamber, and an air reservoir enclosing said air distribution chamber, said distribution chamber and air reservoir having a common wall extending substantially the full length thereof and beyond the exhaust end of said combustion chamber and bleed ports in said common wall for directly bleeding compressed air from said distribution chamber to said air reservoir, and an outlet for said air reservoir.

5. A turbine driven compressed air generator comprising a turbine, a compressor, a shaft connecting said turbine and compressor, an annular combustion chamber for generating the combustion gases for driving said turbine and disposed longitudinally between said compressor and turbine and concentric with respect to said shaft, an annular air distribution chamber enclosing said combustion chamber and extending longitudinally for the entire length of said combustion chamber, a plurality of longitudinally spaced sets of air inlet ports connecting said distribution chamber with said combustion chamber and through which air is introduced directly into said combustion chamber from said air distribution chamber, and an air reservoir enclosing said air distribution chamber and insulated for its entire length by said air distribution chamber from said combustion chamber, said distribution chamber and air reservoir having a common wall extending substantially the full length thereof and beyond the exhaust end of said combustion chamber, said common wall having bleed ports for bleeding compressed air to said air reservoir, said compressor being located forwardly of the air distribution chamber and introducing compressed air generally longitudinally therein, said compressed air for combustion being turned generally radially inwardly for induction to said combustion chamber, and said compressed air for said air reservoir being turned generally radially outwardly for induction to said air reservoir, and an outlet for said air reservoir.

6. A turbine driven compressed air generator comprising a turbine, a compressor, a shaft connecting said turbine and compressor, an annular combustion chamber for generating the combustion gases for driving said turbine and disposed longitudinally between said compressor and turbine and concentric with respect to said shaft, an annular air distribution chamber enclosing said combustion chamber and extending longitudinally for the entire length of said combustion chamber, a plurality of longitudinally spaced sets of air inlet ports connecting said distribution chamber with said combustion chamber and through which air is introduced directly into said combustion chamber from said air distribution chamber, and an air reservoir enclosing said air distribution chamber and insulated for its entire length by said air distribution chamber from said combustion chamber, said distribution chamber and air reservoir having a common wall extending substantially the full length thereof and beyond the exhaust end of said combustion chamber, said common wall having bleed ports for bleeding compressed air to said air reservoir, said compressor being located forwardly of the air distribution chamber and introducing compressed air generally longitudinally therein, said compressed air for combustion being turned generally radially inwardly for induction to said combustion chamber, and said compressed air for said air reservoir being turned generally radially outwardly for induction to said air reservoir, an outlet for said air reservoir and both said air distribution chamber and said air reservoir being progressively curved radially inwardly adjacent the turbine end of said air generator.

7. A turbine driven compressed air generator comprising a turbine, a compressor, a shaft connecting said turbine and compressor, an annular combustion chamber for generating the combustion gases for driving said turbine and disposed longitudinally between said compressor and turbine and concentric with respect to said shaft, an annular air distribution chamber enclosing said combustion chamber and extending longitudinally for the entire length of said combustion chamber, a plurality of longitudinally spaced sets of air inlet ports connecting said distribution chamber with said combustion chamber and through which air is introduced directly into said combustion chamber from said air distribution chamber, and an air reservoir enclosing said air distribution chamber and insulated for its entire length by said air distribution chamber from said combustion chamber, said distribution chamber and air reservoir having a common wall extending substantially the full length thereof and beyond the exhaust end of said combustion chamber, said common wall having bleed ports for bleeding compressed air to said air reservoir, said compressor being located forwardly of the air distribution chamber and introducing compressed air generally longitudinally therein, said compressed air for combustion being turned generally radially inwardly for induction to said combustion chamber, and said compressed air for said air reservoir being turned generally radially outwardly for induction to said air reservoir, an outlet for said air reservoir and both said air distribution chamber and said air reservoir being progressively curved radially inwardly adjacent the turbine end of said air generator and said bleed ports being located more remote from the compressor end of said air generator than said air inlet ports to said combustion chamber.

8. A turbine driven compressed air generator comprising a turbine, a compressor driven by said turbine, an annular combustion chamber located intermediate said compressor and turbine and constructed for generating the combustion gases for driving said turbine, an annular air distribution chamber enclosing said combustion chamber, an air reservoir enclosing said distribution chamber, means connecting said compressor with said air distribution chamber and operable to introduce compressed air generally longitudinally and axially into said distribution chamber, means connecting said distribution chamber with said combustion chamber and operable to introduce compressed air generally radially inwardly into said combustion chamber, and means connecting said air distribution chamber with said air reservoir and operable to introduce compressed air generally radially outwardly into said air reservoir.

9. A turbine driven compressed air generator comprising a turbine, a compressor driven by said turbine, an annular combustion chamber located intermediate said compressor and turbine and constructed for generating the combustion gases for driving said turbine, an annular air distribution chamber enclosing said combustion chamber, an air reservoir enclosing said distribution chamber and adapted for storing air under static pressure, means connecting said compressor with said air distribution chamber and operable to introduce compressed air generally longitudinally and axially into said distribution chamber, means connecting said distribution chamber with said combustion chamber and operable to introduce compressed air generally radially inwardly into said combustion chamber, and means connecting said air distribution chamber with said air reservoir and operable to introduce compressed air generally radially outwardly into said air reservoir, and outlet means for said reservoir selectively operable to tap said supply of air maintained therein under static pressure.

References Cited in the file of this patent

UNITED STATES PATENTS

| | | |
|---|---|---|
| 2,399,046 | Larrecq | Apr. 23, 1946 |
| 2,435,836 | Johnson | Feb. 10, 1948 |
| 2,488,783 | Stalker | Nov. 22, 1949 |
| 2,582,848 | Price | Jan. 15, 1952 |
| 2,618,470 | Brown et al. | Nov. 18, 1952 |
| 2,647,366 | McCann | Aug. 4, 1953 |
| 2,677,932 | Forsling | May 11, 1954 |